April 16, 1957  C. L. SPEXARTH  2,788,676
TWIST GRIP BOWDEN WIRE OPERATOR

Filed March 19, 1953  2 Sheets-Sheet 1

INVENTOR
CHRISTIAN L. SPEXARTH

BY Wheeler, Wheeler & Wheeler
ATTORNEYS

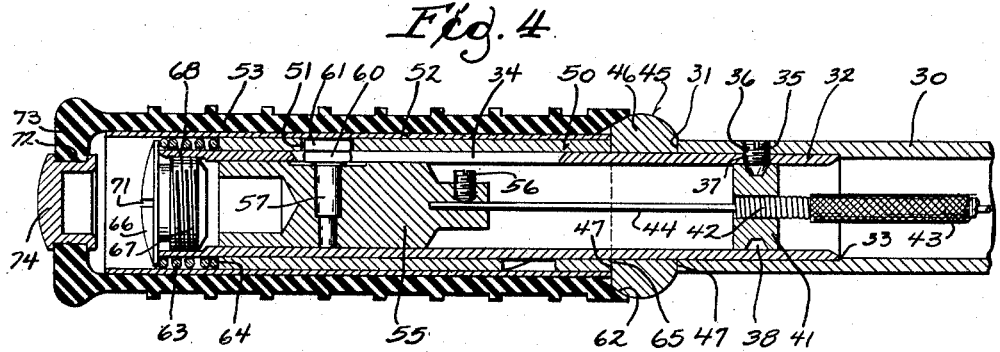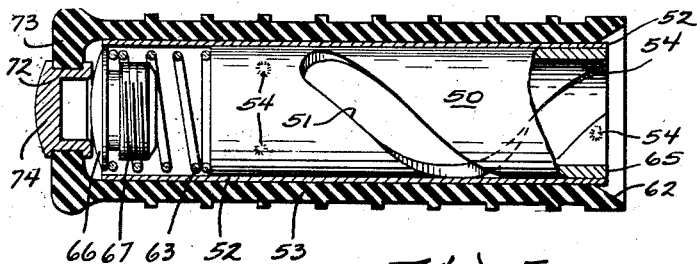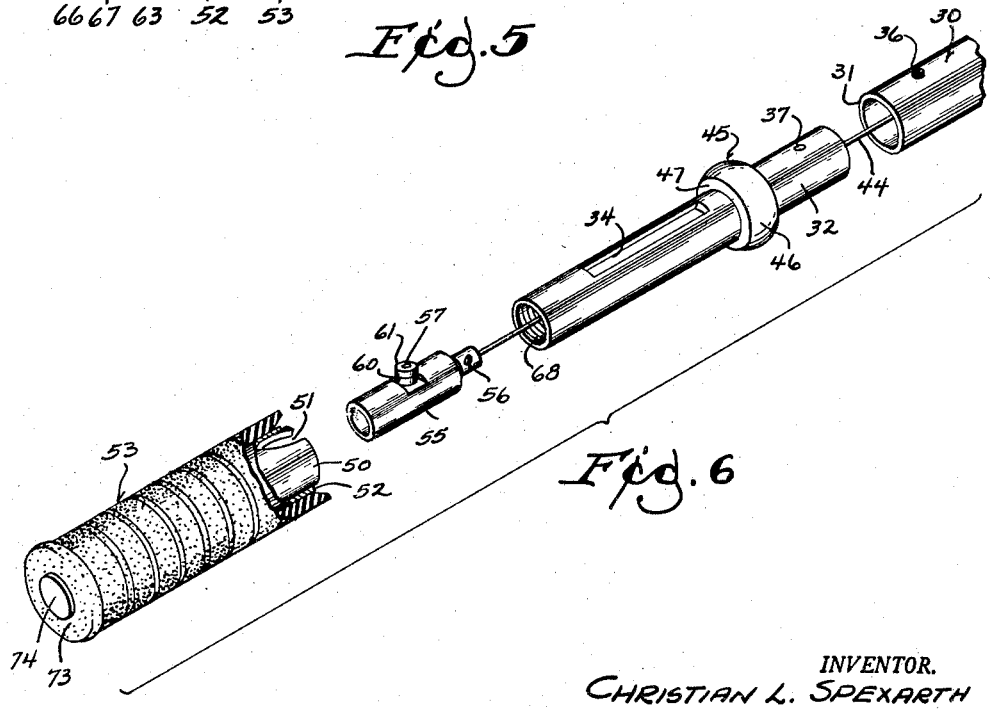

United States Patent Office

2,788,676
Patented Apr. 16, 1957

2,788,676

TWIST GRIP BOWDEN WIRE OPERATOR

Christian L. Spexarth, Milwaukee, Wis., assignor to Harley-Davidson Motor Co., Milwaukee, Wis., a corporation of Wisconsin Application March 19, 1953, Serial No. 343,367

14 Claims. (Cl. 74—489)

This invention relates to a twist grip Bowden wire operator such as is adapted to be incorporated in motorcycle handle bars for actuating engine throttles and the like.

This application is a continuation in part of my application Serial No. 12,925 filed March 4, 1948 and entitled "Twist Grip Bowden Wire Operator."

It is the primary object of the invention to produce a novel and simple operator which may readily be incorporated in a motorcycle handle bar and may readily be removed therefrom for repairs, the individual parts being particularly accessible, simple, inexpensive and easily assembled and disassembled.

As applied to a motorcycle handle bar, it is an important object of the invention to provide a device in which the rubber grip not only performs its usual functions but is provided with a tapered end portion engaged with a fixed ridge to provide a water tight and grease tight seal to hold lubricant within the grip and to exclude water therefrom. In previously known devices this has always been a problem, both during the winter and the summer. In the winter, water entering the control mechanism freezes and renders the control inoperative. During the summer the lubricant tends to ooze out and soil the operator's hand. By using the inherent elasticity of the material comprising the grip and a resilient engagement of the rotatable grip with a stationary ridge, I am able to solve these problems.

More particularly, it is an object of the invention to provide means for holding the elastic grip in sealing contact with the ridge. In one embodiment of the invention I utilize a retaining ring which engages an outturned flange on a metal sleeve to which the elastic sleeve is fastened. In another embodiment of the invention I employ a spring acting between the handle bar and the sleeve to which the elastic grip is fastened and which biases the grip toward overlapping engagement with the ridge.

Another specific object of the invention is to provide a cam feed apparatus which feeds a Bowden wire operator along the handle bar, there being a single stud mounted on the operator and projecting for engagement with a rectilinear slot in the handle bar and a helical slot in the feed cam. In the preferred form of the invention the feed cam has a bearing externally of the handle bar so that the helical slot is disposed at the maximum practical radius to improve the mechanical advantage between the cam and the stud and to lessen the tendency for the feed cam to bind against the stud.

Other objects of the invention will appear more fully in the following disclosure thereof.

In the drawings:

Fig. 4 is an enlarged fragmentary detailed view through another embodiment of my handle bar and operator in axial section.

Fig. 5 is a view similar to that of Fig. 4 showing the handle grip and feed cam apparatus before assembly with the handle bar, the feed cam being shown partly in elevation and partly in section.

Fig. 6 is a view showing in perspective the relatively separated component parts of the handle bar and operator shown in Fig. 4.

Figure 1:
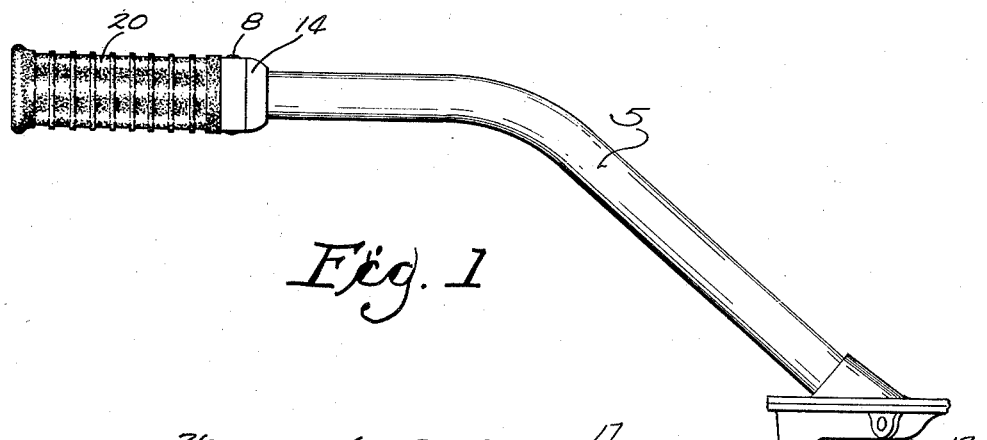
Fig. 1 is a view in side elevation of a motorcycle handle bar to which has been applied a throttle operator embodying the invention.

As usual, the handle bar 5 is tubular. In the embodiment of the invention shown in Figs. 2 and 3, it is provided at its outer end with a slot at 6 which, as shown, preferably has substantial axial dimension. The handle bar is also tapped at 7 to receive the screws 8 and is tapped at 9 to receive a screw 10. The latter screw is a taper screw set into the annular groove of a spool shaped anchorage member 11 in which is anchored the terminal portion 12 of the sheath for the Bowden wire 13 which may operate a throttle (not shown).

Since the anchorage member 11 is spool-shaped, it is not necessary to index it to a particular annular position but only to move it axially to the point where its grooved periphery registers with the screw hole 9. Thereupon, the screw 10 may be inserted to fix the position of the end of the Bowden wire sheath.

Each of the tapped openings 7 receives a screw at 8 which passes through the finishing annulus 14 and holds a flanged retainer ring 15. The inwardly turned flange 16 of this ring engages over an outwardly turned flange 17 on a grip sleeve 18 which is rotatably mounted exteriorly upon the end of the tubular handle bar and to which the rubber handle 20 is fastened, usually by cement. It will be noted in Fig. 2 that the end of the sleeve 18 projects beyond the end of the handle bar.

At the end of the rubber handle grip 20, the rubber sleeve is beveled outwardly and its thinned free end laps the retainer ring 15. The diameter of the ring is such that the rubber has to be stretched slightly to engage thereover, the bias of the rubber upon the ring 15, or against the flange 16 thereof, forming an effective seal which, notwithstanding relative rotation between the parts, excludes water and retains lubricant.

Figure 2:
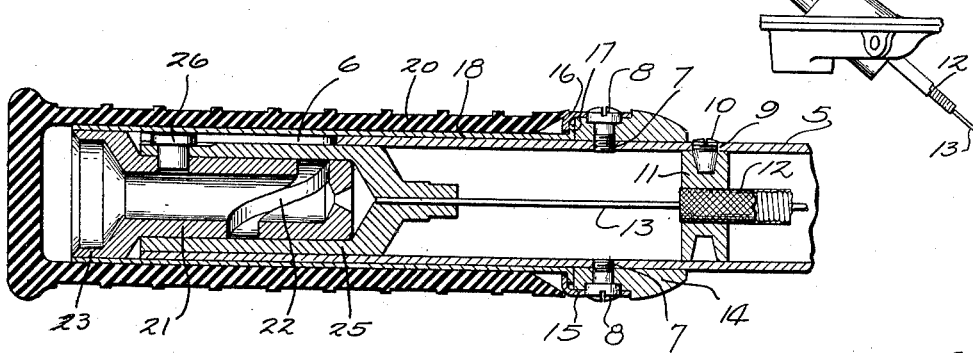
Fig. 2 is an enlarged fragmentary detailed view through one embodiment of my handle bar and operator in axial section.

Spaced well within the tubular handle bar 5 is the cam member 21, which is provided with a helical groove at 22 and has an enlarged end 23 which is fastened into the end of the sleeve 18 by pressing it to a fit therein as shown in Fig. 2. This connection is made beyond the end of the handle bar. Since the sleeve 18 is secured by interlocking engagement of its flange 17 between the annular stop 14 and the flange 16 of ring 15, the only movement of which sleeve 18 is capable is a rotative movement on the handle bar. Such rotative movement as is imparted to it by the manipulation of the grip 18, 20 by the operator's hand, is communicated through the enlarged end 23 to the cam member 21.

Fitted between the cam member 21 and the interior surface of the handle bar 5 is the axially reciprocable operating sleeve 25 which is connected with the end of the Bowden wire 13. The sleeve 25 is constrained to move axially in the handle bar by a radially projecting stud 26 engaged in the axial slot 6 of the handle bar.

The same stud 26 projects inwardly from sleeve 25 into the helical slot 22 in the cam member 21. Thus, upon the rotation of the member 21, the cam slot 22 feeds the stud 26 which, being constrained by its engagement in slot 6 to move in an axial direction only, effects an axial movement of the wire-operating sleeve 25, thereby moving the wire 13 inwardly or outwardly according to the direction in which the grip 18, 20 is rotated by the operator.

Figure 3:
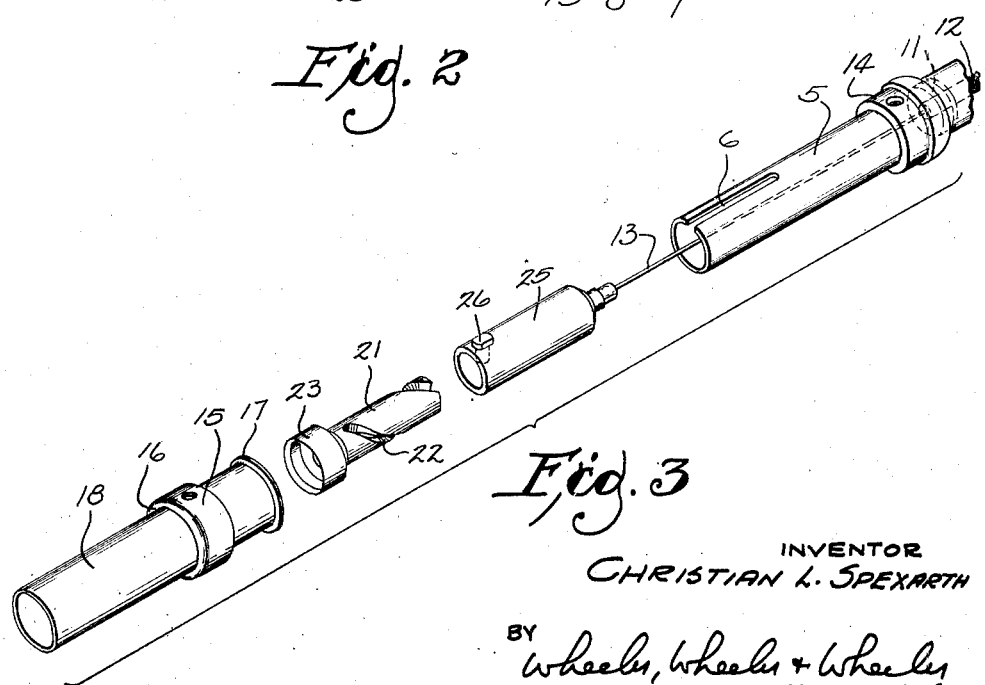
Fig. 3 is a view showing in perspective the relatively separated component parts of the handle bar and operator shown in Fig. 2.

The end of the handle bar has a cylindrical interior surface which receives the actuating sleeve 25, the reduced end of which is connected with wire 13. The operating cam 21, in turn, is rotatably supported and confined within the sleeve 25 and has a unitary connection with the grip sleeve 18 bearing on the outside peripheral surface of the handle bars. With the retaining ring 15 in place over the sleeve 18 as shown in Fig. 3, the ring is moved up into engagement with flange 17 and the handle 20 is applied and cemented in place as shown in Fig. 2. The entire assembly is then moved axially into and upon the handle bar until the apertures of the retaining ring register with the apertures of the stop member 14 and those at 7 in the handle bar. Thereupon the screws 8 are inserted to maintain the assembly, no further mounting arrangement being required. The flange 17 cannot move inwardly respecting the handle bar because it abuts the member 14, nor can it move outwardly because it is restrained by the flange 16 of the retaining ring 15. Yet, when replacement or repair is necessary, the removal of screws 8 permits the entire assembly to be withdrawn as shown in Fig. 3.

In the embodiment of Figures 4, 5, and 6, the handle bar 30 terminates at 31 and is provided with a tubular extension 32 having a portion disposed within tubular handle bar 30 and seated against annular shoulder 33 therewithin. Beyond end 31 of handle bar 30 handle bar extension 32 is provided with a rectilinear slot 34 of substantial axial dimension and comparable in function to handle bar slot 6 of the embodiment of Figures 2 and 3. Handle bar 30 is tapped at 35 to receive the screw 36 which registers with aperture 37 in handle bar extension 32 and seats into the annular groove 38 on spool shaped anchorage member 41. The anchorage member 41 receives in fixed relation the terminal portion 42 of the sheath 43 of Bowden wire 44.

Handle bar extension 32 is also provided with an annular collar 45 having a convex outer periphery 46 and substantially flat sides 47. Inner side 47 seats against the end 31 of handle bar 30 when the extension 32 is assembled to the handle bar proper. The outer side 47 of collar 45 provides a shoulder against which is seated the inner end 65 of the tubular feed cam 50 which is provided with a helically cut cam slot 51. The feed cam 50 is desirably formed from a flat sheet which is rolled into a cylindrical sleeve and internally spot welded at 54 to an outer sleeve 52 to which the elastic hand grip 53 is cemented or otherwise secured. As best shown in Fig. 5 care is taken to provide spot welds 54 between the feed cam 50 and outer sleeve 52 adjacent the end margins of the cam slot 51. As best shown in Fig. 4 the sleeve 52 closes the helical cam slot 51 at the outer periphery of cam 50.

In this embodiment of the invention the feed cam 50 is external of the handle bar extension 32 and rotatably bears on the outer peripheral surface of this extension. The extension 32 is of smaller diameter than the handle bar 30. As feed cam 50 is of substantially the same diameter as the handle bar 30 it substantially aligns endwise therewith.

Within the tubular handle bar extension 32 is a Bowden wire operator 55 connected by means of the set screw 56 to the Bowden wire 44. The operator 55 carries a stud or post 57 having two independently rotatable cam rollers 60 and 61. Cam rollers 60 is aligned for engagement with the margins of the rectilinear slot 34 in the handle bar extension 32. Cam roller 61 is aligned for engagement with the side margins of the helical cam slot 51 of the feed cam 50. Accordingly, as the feed cam is rotated, and according to the direction of rotation, rollers 60 and 61 will engage one or the other of the side margins of slots 34 and 51.

In this embodiment of the invention the feed cam is disposed at the greatest practical radial distance from the axis of cam rotation to increase the mechanical advantage of the cam. Accordingly, in this embodiment of the invention there is little or no tendency for the cam to lock or bind against the stud 57.

As in the embodiment of the invention shown in Figs. 2 and 3 the elastic grip has its open end margin beveled at 62 to overlap the outwardly convex periphery 46 of collar 45. This overlapping engagement is kept snug by means of a coil spring 63 mounted at the outer end 64 of the feed cam 50. Spring 63 is disposed about the extreme end of handle bar extension 32 and seats against enlarged head 66 of a screw 67 having threads engaged with complementary threads 68 cut into the inner periphery of the free end of handle bar extension 32.

Screw 67 is normally tightened for engagement of its head 66 against the end of handle bar extension tube 32 by means of a slot 71 in the head 66. This slot is accessible for manipulation through an axial aperture 72 in end wall 73 of grip 53. Aperture 72 is normally closed by a rubber or other elastic plug 74 which seals the end wall about the feed cam mechanism.

Spring 63 also serves to take up wear at the inner end 65 of feed cam 50 where it rotatably seats against the collar 45. The spring also has a slight frictional resistance to turning the handle grip and takes up the lost motion which otherwise would exist because of the necessary clearances between roller 61 and the margins of the feed cam slot 51.

My operator is adaptable for use wherever an axially moving part such as a Bowden wire is to be reciprocated through the medium of a rotatable grip or the like. For the purposes of the appended claims, either the rubber members 20, 53 or the underlying sleeves 18, 52 or both together may be characterized as the grip.

I claim:

1. In a device of the character described, the combination with an axially slotted tube, of an annular stop member mounted on the tube in a position spaced from the end thereof, a ring supported on the stop member and having a flange inwardly formed toward the tube in spaced relation to the stop member, a sleeve rotatably mounted externally upon the tube and projecting therebeyond, said sleeve having an outwardly formed flange confined between the stop member and the inwardly turned flange of said ring, a feed screw spaced within the tube and having an enlarged head connected with the projecting end of the sleeve beyond the end of the tube, and a second sleeve interposed between the feed screw and the tube and provided with stud means meshing with the feed screw and stud means engaged with the slot of the tube to be driven axially upon the rotation of the sleeve first mentioned.

2. In a motorcycle throttle operator, the combination with a handle bar tube having a slotted end and having internal and external bearing surface, of a sleeve mounted to rotate externally upon the external bearing surface of the tube and projecting beyond the slotted end thereof, means for confining said sleeve against axial displacement relative to the tube while permitting the sleeve to rotate, a second sleeve axially reciprocable upon the interior bearing surface of the tube and having a stud engaged with the slot thereof, a feed cam mounted within the second sleeve and having an enlarged head substantially equal in diameter to the interior of the first sleeve and connected with the inner periphery of the first sleeve beyond the end of the tube, a stud on the second sleeve engaging the cam to receive motion therefrom during the rotation of the external sleeve first mentioned, and a handle mounted on the sleeve first mentioned and comprising an end wall closing the first sleeve about said head.

3. The combination with a tubular handle bar having an axial slot near its end and provided at points spaced from the end with tapped openings, of an annular stop member encircling said handle bar adjacent one of said openings, a grip comprising a sleeve externally mounted on the handle bar for rotation thereon provided with an outwardly directed flange abutting said stop member, a retaining ring encircling the stop member and having an inwardly directed flange engaged about the flange of said sleeve, a screw extending through the stop member into one of said openings and anchoring said ring and stop member with respect to the handle bar, a Bowden wire anchorage having a positioning screw engaged in another opening of the handle bar, a Bowden wire sheath fixed in said anchorage, a Bowden wire projecting from the sheath toward the end of the handle bar, a Bowden wire actuating sleeve connected with the Bowden wire and having a stud engaged in the slot of the handle bar, and a cam member rotatable within said Bowden wire actuating sleeve and having a cam slot with which said stud is also engaged, said slot having a generally helical disposition, and means for connecting said cam member with the grip to receive rotation therefrom, said connecting means being located beyond the end of the handle bar.

4. The combination with a handle bar and throttle operating mechanism therein, of an actuator for said mechanism comprising a grip rotatable externally upon the handle bar and having an end wall enclosing the end of the bar, said grip including a metal sleeve and an elastic sleeve having a beveled edge, the handle bar being provided remote from its end with a fixed retainer ring for the metal sleeve with the outer periphery of which the beveled edge of the elastic sleeve overlaps both radially and axially in pressure engagement at the end of the elastic sleeve remote from said wall, whereby not only to constitute a grip but to provide a seal.

5. A device of the character described comprising the combination with a handle bar and throttle operating mechanism therein, of a sleeve rotatable externally upon the handle bar and connected about the end of the handle bar with said mechanism for the actuation thereof, a flange in the inner end of said sleeve, a retaining ring provided with a fixed mounting upon the handle bar and engaged about said flange to position said sleeve, and a rubber grip handle fixed to said sleeve and having a closure across the end thereof, said handle having at its inner end an outwardly tapering resiliently flexible portion slightly expanded and engaged with a portion of said ring to constitute therewith a seal for the retention of lubricant and exclusion of water.

6. In a motorcycle throttle operator, the combination with a handle bar tube having a longitudinal slot and an external grip, of a reciprocable Bowden wire operator within the tube, a feed cam having a helical slot, stud means mounted on the Bowden wire operator and having stud projections respectively engaged with the tube slot and with the cam slot, and a connection between the external grip and feed cam whereby rotation of the grip will rotate the feed cam to move the stud means and the Bowden wire operator longitudinally along the tube slot, said feed cam being provided with an enlarged head beyond the end of the handle bar tube and substantially equal in diameter to the handle bar tube said external grip having an inner periphery frictionally engaged with said head to constitute said connection, said grip having an end wall enclosing said head.

7. In a motorcycle throttle operator, the combination with a handle bar tube having a longitudinal slot and an external grip, of a reciprocable Bowden wire operator within the tube, a feed cam having a helical slot, stud means mounted on the Bowden wire operator and having stud projections respectively engaged with the tube slot and with the cam slot, and a connection between the external grip and feed cam whereby rotation of the grip will rotate the feed cam to move the stud means and the Bowden wire operator longitudinally along the tube slot, in further combination with means resisting feed cam rotation, said means comprising a spring seated against the end of said cam.

8. In a motorcycle throttle operator, the combination with a handle bar tube having a longitudinal slot and an external grip, of a reciprocable Bowden wire operator within the tube, a feed cam having a helical slot, stud means mounted on the Bowden wire operator and having stud projections respectively engaged with the tube slot and with the cam slot, and a connection between the external grip and feed cam whereby rotation of the grip will rotate the feed cam to move the stud means and the Bowden wire operator longitudinally along the tube slot, said feed cam comprising a sleeve external of the handle bar tube, said external grip being contiguous with and directly connected to the feed cam to provide a walled closure for the helical slot, the Bowden wire operator stud means comprising a single stud extended through the slot in the handle bar tube into engagement with the slot in the feed cam.

9. The combination with a handle bar and throttle operating mechanism therein, of an actuator for said mechanism comprising a grip rotatable externally upon the handle bar and having an end wall enclosing the end of the bar, said grip including an elastic sleeve having a beveled edge, the handle bar being provided remote from its end with a fixed peripheral ridge with the outer periphery of which the beveled edge of the elastic sleeve overlaps both radially and axially in pressure engagement at the end of the elastic sleeve remote from said wall, whereby not only to constitute a grip but to provide a seal.

10. The combination with a handle bar and throttle operating mechanism therein, of an actuator for said mechanism comprising a grip rotatable externally upon the handle bar and having an end wall enclosing the end of the bar, said grip including an elastic sleeve, the handle bar being provided remote from its end with a fixed peripheral ridge with the outer periphery of which the elastic sleeve overlaps in pressure engagement at the end of the elastic sleeve remote from said wall, whereby not only to constitute a grip but to provide a seal, in further combination with means for biasing said elastic sleeve toward overlapping engagement with said ridge and comprising a spring mounted on said handle bar and in pressure transmission engagement with said elastic sleeve.

11. The device of claim 10 in which said elastic sleeve is mounted on an internal sleeve having one end abutting said ridge and another end engaged with said spring.

12. The device of claim 11 in which the end of the handle bar is provided with a screw having an enlarged head extending radially beyond the outer periphery of the handle bar, said head providing a seat for one end of the spring which is coiled about the handle bar, said internal sleeve being rotatable on the outer periphery of the handle bar in contact with the other end of the spring.

13. In a motorcycle throttle operator, the combination with a handle bar tube having an extension of less diameter than the tube, the extension being provided with a slot, said extension having internal and external bearing surfaces, of a Bowden wire operator mounted for rectilinear movement within said extension and a feed cam sleeve mounted for rotation on the external bearing surface of the extension, said feed cam sleeve mounted for rotation on the external bearing surface of the extension, said feed cam sleeve being provided with a helical slot, a stud mounted on the operator and extending into engagement with both said handle bar extension slot and said feed cam slot and an external grip mounted for unitary turning with said feed cam, said feed cam being of substantially the same peripheral diameter as the handle bar, in further combination with a collar mounted on said extension and having an inner face shouldered against the end of the handle bar and having an outer face providing a shoulder against which the inner end of the feed cam abuts, and a spring mounted at the outer end of the feed cam and having an anchorage against the handle bar extension, said spring being biased whereby to urge the feed cam against shouldering engagement with the collar.

14. The device of claim 13 in which the handle bar extension is provided with a screw having an enlarged head projecting radially beyond the extension and against which the spring is seated, said handle bar grip having an end wall and means providing access through said end wall to said screw for manipulation thereof.

References Cited in the file of this patent

UNITED STATES PATENTS

| | | | |
|---|---|---|---|
| 572,255 | Hall | Dec. 1, 1896 |
| 1,231,055 | Packard | June 26, 1917 |
| 2,146,467 | Davis | Feb. 7, 1939 |

FOREIGN PATENTS

| | | | |
|---|---|---|---|
| 703,733 | Germany | Mar. 14, 1907 |
| 22,508 of 1906 | Great Britain | Oct. 10, 1907 |
| 465,958 | Great Britain | May 18, 1937 |
| 614,327 | Great Britain | Dec. 14, 1948 |
| 434,602 | Italy | Apr. 28, 1948 |